(12) United States Patent
Belt et al.

(10) Patent No.: US 11,976,466 B2
(45) Date of Patent: *May 7, 2024

(54) SHINGLE WITH REINFORCEMENT MEMBER

(71) Applicant: Owens Corning Intellectual Capital, LLC, Toledo, OH (US)

(72) Inventors: James S. Belt, Utica, OH (US); Bert W. Elliott, Toledo, OH (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/966,957

(22) Filed: Oct. 17, 2022

(65) Prior Publication Data

US 2023/0031840 A1 Feb. 2, 2023

Related U.S. Application Data

(63) Continuation of application No. 17/313,128, filed on May 6, 2021, now Pat. No. 11,661,744, which is a
(Continued)

(51) Int. Cl.
*E04D 1/28* (2006.01)
*B32B 3/06* (2006.01)
(Continued)

(52) U.S. Cl.
CPC ............ *E04D 1/28* (2013.01); *B32B 3/06* (2013.01); *B32B 3/30* (2013.01); *B32B 5/022* (2013.01);
(Continued)

(58) Field of Classification Search
CPC .... E04D 1/28; E04D 1/12; E04D 1/20; E04D 1/26; E04D 1/34; B32B 3/06; B32B 3/30;
(Continued)

(56) References Cited

U.S. PATENT DOCUMENTS

| 1,467,510 A | 9/1923 | Smith, Jr. |
| 1,597,135 A | 8/1926 | Wittenberg |

(Continued)

FOREIGN PATENT DOCUMENTS

| CA | 1207975 A1 | 7/1986 |
| CN | 2176391 Y | 9/1994 |

(Continued)

OTHER PUBLICATIONS

Notice of Allowance from U.S. Appl. No. 13/097,810 dated Aug. 20, 2013.
(Continued)

*Primary Examiner* — Adriana Figueroa
(74) *Attorney, Agent, or Firm* — Calfee, Halter & Griswold LLP

(57) ABSTRACT

A roofing shingle includes an overlay sheet, an underlay sheet, and a reinforcement member. The overlay sheet includes a headlap portion and a tab portion, wherein the overlay sheet has an overlay sheet height. The underlay sheet is secured to a bottom surface of the overlay sheet such that a region of the underlay sheet overlaps a region of the headlap portion of the overlay sheet. The reinforcement material is secured to a top surface of the headlap portion of the overlay sheet, wherein the reinforcement material is configured to improve nail pull-through, wherein the reinforcement material extends beyond the overlapping regions of the headlap portion and the underlay sheet.

20 Claims, 4 Drawing Sheets

Related U.S. Application Data continuation of application No. 16/923,009, filed on Jul. 7, 2020, now Pat. No. 11,028,589, which is a continuation of application No. 16/580,143, filed on Sep. 24, 2019, now Pat. No. 10,753,097, which is a continuation of application No. 15/980,268, filed on May 15, 2018, now Pat. No. 10,428,525, which is a continuation of application No. 15/590,222, filed on May 9, 2017, now Pat. No. 10,000,929, which is a continuation of application No. 15/093,925, filed on Apr. 8, 2016, now Pat. No. 9,657,478, which is a continuation of application No. 14/813,315, filed on Jul. 30, 2015, now Pat. No. 9,624,670, which is a continuation of application No. 14/267,956, filed on May 2, 2014, now Pat. No. 9,121,178, which is a continuation of application No. 14/105,913, filed on Dec. 13, 2013, now Pat. No. 8,752,351, which is a continuation of application No. 13/097,810, filed on Apr. 29, 2011, now Pat. No. 8,607,521, which is a continuation-in-part of application No. 12/895,195, filed on Sep. 30, 2010, now Pat. No. 8,181,413, which is a continuation of application No. 11/198,522, filed on Aug. 5, 2005, now Pat. No. 7,836,654.

(51) Int. Cl.
| | | |
|---|---|---|
| *B32B 3/30* | (2006.01) | |
| *B32B 5/02* | (2006.01) | |
| *B32B 5/26* | (2006.01) | |
| *B32B 7/12* | (2006.01) | |
| *B65D 69/00* | (2006.01) | |
| *E04D 1/12* | (2006.01) | |
| *E04D 1/20* | (2006.01) | |
| *E04D 1/26* | (2006.01) | |
| *E04D 1/34* | (2006.01) | |
| *E04D 1/00* | (2006.01) | |

(52) U.S. Cl.
CPC .............. *B32B 5/024* (2013.01); *B32B 5/26* (2013.01); *B32B 7/12* (2013.01); *B65D 69/00* (2013.01); *E04D 1/12* (2013.01); *E04D 1/20* (2013.01); *E04D 1/26* (2013.01); *E04D 1/34* (2013.01); *B32B 2255/24* (2013.01); *B32B 2260/023* (2013.01); *B32B 2260/042* (2013.01); *B32B 2264/10* (2013.01); *B32B 2419/06* (2013.01); *E04D 2001/005* (2013.01); *E04D 2001/3423* (2013.01); *E04D 2001/3452* (2013.01); *E04D 2001/3491* (2013.01); *Y10T 428/24612* (2015.01); *Y10T 428/24752* (2015.01)

(58) Field of Classification Search
CPC ........... B32B 5/022; B32B 5/024; B32B 5/26; B32B 7/12
See application file for complete search history.

(56) References Cited

U.S. PATENT DOCUMENTS

| | | |
|---|---|---|
| 1,601,731 A | 10/1926 | Flood |
| 1,665,222 A | 4/1928 | Robinson |
| 1,701,926 A | 2/1929 | Kirschbraun |
| 1,799,500 A | 4/1931 | Arcy |
| 2,161,440 A | 6/1939 | Venrick |
| 2,798,006 A | 7/1957 | Oldfield et al. |
| 2,847,948 A | 8/1958 | Truitt |
| 2,863,405 A | 12/1958 | Leibrook et al. |
| 3,054,222 A | 9/1962 | Buckner |
| 3,082,577 A | 3/1963 | Fasold et al. |
| 3,180,783 A | 4/1965 | Walker et al. |
| 3,236,170 A | 2/1966 | Meyer et al. |
| 3,247,631 A | 4/1966 | Lovness |
| 3,252,257 A | 5/1966 | Price et al. |
| 3,332,830 A | 7/1967 | Tomlinson et al. |
| 3,377,762 A | 4/1968 | Chalmers et al. |
| 3,468,086 A | 9/1969 | Warner |
| 3,468,092 A | 9/1969 | Chalmers |
| 3,606,677 A | 9/1971 | Ryan |
| 3,624,975 A | 12/1971 | Morgan et al. |
| 3,640,044 A | 2/1972 | Watts |
| 3,664,081 A | 5/1972 | Martin et al. |
| 3,848,384 A | 11/1974 | Eaton et al. |
| 3,850,724 A | 11/1974 | Lehmacher |
| 3,949,657 A | 4/1976 | Sells |
| 3,991,130 A | 11/1976 | Cowell et al. |
| 4,102,107 A | 7/1978 | Barker et al. |
| 4,195,461 A | 4/1980 | Thiis-Evensen |
| 4,301,633 A | 11/1981 | Neumann |
| 4,459,157 A | 7/1984 | Koons |
| 4,634,622 A | 1/1987 | Jenkins et al. |
| 4,680,909 A | 7/1987 | Stewart |
| 4,706,435 A | 11/1987 | Stewart |
| 4,717,614 A | 1/1988 | Bondoc et al. |
| 4,755,545 A | 7/1988 | Lalwani |
| 4,803,813 A | 2/1989 | Fiterman |
| 4,817,358 A | 4/1989 | Lincoln et al. |
| 4,824,880 A | 4/1989 | Algrim et al. |
| 4,848,057 A | 7/1989 | MacDonald et al. |
| 4,856,251 A | 8/1989 | Buck |
| 4,952,268 A | 8/1990 | Beck et al. |
| 5,181,361 A | 1/1993 | Hannah et al. |
| 5,209,802 A | 5/1993 | Hannah et al. |
| 5,232,530 A | 8/1993 | Malmquist et al. |
| 5,239,802 A | 8/1993 | Robinson |
| 5,251,416 A | 10/1993 | White |
| 5,305,569 A | 4/1994 | Malmquist et al. |
| 5,426,902 A | 6/1995 | Stahl et al. |
| 5,571,596 A | 11/1996 | Johnson |
| 5,577,361 A | 11/1996 | Grabek, Jr. |
| 5,611,186 A | 3/1997 | Weaver |
| 5,660,014 A | 8/1997 | Stahl et al. |
| 5,822,943 A | 10/1998 | Frankoski et al. |
| 5,860,263 A | 1/1999 | Sieling et al. |
| 5,901,517 A | 5/1999 | Stahl et al. |
| 5,916,103 A | 6/1999 | Roberts |
| 5,950,387 A | 9/1999 | Stahl et al. |
| 6,010,589 A | 1/2000 | Stahl et al. |
| 6,021,611 A | 2/2000 | Wells et al. |
| 6,038,826 A | 3/2000 | Stahl et al. |
| 6,044,608 A | 4/2000 | Stahl et al. |
| 6,083,592 A | 7/2000 | Chich |
| 6,145,265 A | 11/2000 | Malarkey et al. |
| 6,148,578 A | 11/2000 | Nowacek et al. |
| 6,174,403 B1 | 1/2001 | Steiner et al. |
| 6,199,338 B1 | 3/2001 | Hudson et al. |
| 6,220,329 B1 | 4/2001 | King et al. |
| 6,228,785 B1 | 5/2001 | Miller et al. |
| 6,247,289 B1 | 6/2001 | Karpinia |
| 6,289,648 B1 | 9/2001 | Freshwater et al. |
| 6,338,230 B1 | 1/2002 | Davey |
| 6,343,447 B2 | 2/2002 | Geissels et al. |
| 6,355,132 B1 | 3/2002 | Becker et al. |
| 6,397,546 B1 | 6/2002 | Marlarkey et al. |
| 6,397,556 B1 | 6/2002 | Karpinia |
| 6,471,812 B1 | 10/2002 | Thompson et al. |
| 6,487,828 B1 | 12/2002 | Phillips |
| 6,523,316 B2 | 2/2003 | Stahl et al. |
| 6,530,189 B2 | 3/2003 | Freshwater et al. |
| 6,610,147 B2 | 8/2003 | Aschenbeck |
| 6,652,909 B2 | 11/2003 | Lassiter |
| 6,679,020 B2 | 1/2004 | Becker et al. |
| 6,679,308 B2 | 1/2004 | Becker et al. |
| 6,692,608 B2 | 2/2004 | Phillips |
| 6,708,456 B2 | 3/2004 | Kiik et al. |
| 6,709,994 B2 | 3/2004 | Miller et al. |
| 6,758,019 B2 | 7/2004 | Kalkanoglu et al. |
| 6,804,919 B2 | 10/2004 | Railkar |
| 6,823,637 B2 | 11/2004 | Elliott et al. |

(56) References Cited

U.S. PATENT DOCUMENTS

| | | |
|---|---|---|
| 6,990,779 B2 | 1/2006 | Kiik et al. |
| 7,082,724 B2 | 8/2006 | Railkar et al. |
| 7,118,794 B2 | 10/2006 | Kalkanoglu et al. |
| 7,127,865 B2 | 10/2006 | Douglas |
| 7,204,910 B2 | 4/2007 | Foubert et al. |
| 7,219,476 B2 | 5/2007 | Akins et al. |
| 7,537,820 B2 | 5/2009 | Kalkanoglu et al. |
| 7,765,763 B2 | 8/2010 | Teng et al. |
| 7,781,046 B2 | 8/2010 | Kalkanoglu et al. |
| 7,836,654 B2 | 11/2010 | Belt et al. |
| 8,156,704 B2 | 4/2012 | Belt et al. |
| 8,173,243 B2 | 5/2012 | Kalkanoglu et al. |
| 8,181,413 B2 | 5/2012 | Belt et al. |
| 8,240,102 B2 | 8/2012 | Belt et al. |
| 8,371,085 B2 | 2/2013 | Koch |
| 8,430,983 B2 | 4/2013 | Vermilion et al. |
| 8,557,366 B2 | 10/2013 | Harrington, Jr. et al. |
| 8,607,521 B2 | 12/2013 | Belt et al. |
| 8,623,164 B2 | 1/2014 | Belt et al. |
| 8,713,883 B2 | 5/2014 | Thies, III |
| 8,752,351 B2 | 6/2014 | Belt et al. |
| 9,121,178 B2 | 9/2015 | Belt et al. |
| 9,605,434 B2 | 3/2017 | Belt et al. |
| 9,624,670 B2 | 4/2017 | Belt et al. |
| 9,657,478 B2 | 5/2017 | Belt et al. |
| 10,000,929 B2 | 6/2018 | Belt et al. |
| 10,308,448 B2 | 6/2019 | Belt et al. |
| 10,315,863 B2 | 6/2019 | Belt et al. |
| 10,322,889 B2 | 6/2019 | Belt et al. |
| 10,428,525 B2 | 10/2019 | Belt et al. |
| 10,753,097 B2 | 8/2020 | Belt et al. |
| 2001/0049002 A1 | 12/2001 | McCumber et al. |
| 2003/0040241 A1 | 2/2003 | Kiik et al. |
| 2003/0093963 A1 | 5/2003 | Stahl et al. |
| 2004/0055240 A1 | 3/2004 | Kiik et al. |
| 2004/0083673 A1 | 5/2004 | Kalkanoglu et al. |
| 2004/0083674 A1 | 5/2004 | Kalkanoglu et al. |
| 2004/0206035 A1 | 10/2004 | Kandalgaonkar |
| 2004/0221536 A1 | 11/2004 | Kalkanoglu et al. |
| 2004/0258883 A1 | 12/2004 | Weaver |
| 2005/0204675 A1 | 9/2005 | Snyder et al. |
| 2006/0032174 A1 | 2/2006 | Floyd |
| 2006/0179767 A1 | 8/2006 | Miller et al. |
| 2006/0265990 A1 | 11/2006 | Kalkanoglu et al. |
| 2007/0039274 A1 | 2/2007 | Harrington et al. |
| 2007/0042158 A1 | 2/2007 | Belt et al. |
| 2008/0134612 A1 | 6/2008 | Koschitzky |
| 2008/0229695 A1 | 9/2008 | Kalkanoglu et al. |
| 2008/0299320 A1 | 12/2008 | Rodrigues et al. |
| 2009/0193745 A1 | 8/2009 | Kalkanoglu et al. |
| 2009/0293404 A1 | 12/2009 | Belt et al. |
| 2010/0077689 A1 | 4/2010 | Kalkanoglu et al. |
| 2010/0098812 A1 | 4/2010 | Le et al. |
| 2010/0143667 A1 | 6/2010 | Collins et al. |
| 2010/0310825 A1 | 12/2010 | Kalkanoglu et al. |
| 2011/0016812 A1 | 1/2011 | Belt et al. |
| 2011/0072752 A1 | 3/2011 | Aschenbeck et al. |
| 2011/0139366 A1 | 6/2011 | Belt et al. |
| 2011/0146185 A1 | 6/2011 | Belt et al. |
| 2011/0197534 A1 | 8/2011 | Belt et al. |
| 2011/0232220 A1 | 9/2011 | Belt et al. |
| 2011/0283646 A1 | 11/2011 | Vermilion et al. |
| 2012/0047838 A1 | 3/2012 | Kalkanoglu et al. |
| 2012/0210666 A1 | 8/2012 | Kalkanoglu et al. |
| 2012/0266559 A1 | 10/2012 | Thies, III |
| 2013/0180196 A1 | 7/2013 | Kalkanoglu et al. |
| 2014/0102030 A1 | 4/2014 | Belt et al. |
| 2016/0090742 A1 | 3/2016 | Belt et al. |
| 2016/0222664 A1 | 8/2016 | Belt et al. |
| 2016/0222665 A1 | 8/2016 | Belt et al. |
| 2016/0222666 A1 | 8/2016 | Belt et al. |
| 2016/0244971 A1 | 8/2016 | Belt et al. |
| 2017/0158440 A1 | 6/2017 | Belt et al. |
| 2017/0241141 A1 | 8/2017 | Belt et al. |

FOREIGN PATENT DOCUMENTS

| | | |
|---|---|---|
| JP | 50-002937 | 1/1975 |
| WO | 2007091399 A1 | 8/2007 |
| WO | 2007108846 A2 | 9/2007 |
| WO | 2008052029 A2 | 5/2008 |

OTHER PUBLICATIONS

Office Action from U.S. Appl. No. 13/155,600 dated Sep. 15, 2011.
Notice of Abandonment from U.S. Appl. No. 13/155,600 dated Mar. 12, 2012.
Office Action from U.S. Appl. No. 13/193,900 dated May 14, 2013.
Office Action from U.S. Appl. No. 13/193,900 dated Jan. 10, 2014.
Office Action from U.S. Appl. No. 13/453,272 dated May 30, 2013.
Office Action from U.S. Appl. No. 13/453,272 dated Nov. 19, 2013.
Notice of Allowance from U.S. Appl. No. 13/453,272 dated Feb. 19, 2014.
Notice of Allowance from U.S. Appl. No. 14/105,913 dated Feb. 7, 2014.
Office Action from U.S. Appl. No. 14/173,917 dated Jun. 6, 2014.
Notice of Allowance from U.S. Appl. No. 14/173,917 dated Dec. 3, 2014.
Office Action from U.S. Appl. No. 14/267,956 dated Nov. 21, 2014.
Notice of Allowance from U.S. Appl. No. 14/267,956 dated May 15, 2015.
Office Action from U.S. Appl. No. 14/132,125 dated Apr. 7, 2016.
Notice of Allowance from U.S. Appl. No. 14/132,125 dated Nov. 15, 2016.
Office Action from U.S. Appl. No. 14/813,315 dated Jul. 29, 2016.
Notice of Allowance from U.S. Appl. No. 14/813,315 dated Dec. 15, 2016.
Office Action from U.S. Appl. No. 15/093,925 dated Jul. 29, 2016.
Notice of Allowance from U.S. Appl. No. 15/093,925 dated Jan. 20, 2017.
Office Action from Chinese Application No. 200680028893.4 dated Mar. 27, 2009.
Office Action from Japanese Application No. 2008-525265 dated Dec. 12, 2011.
Office Action from Japanese Application No. 2008-525265 dated Nov. 5, 2012.
Office Action from U.S. Appl. No. 15/590,222 dated Jun. 30, 2017.
Office Action from U.S. Appl. No. 15/590,222 dated Nov. 1, 2017.
Notice of Allowance from U.S. Appl. No. 15/590,222 dated Feb. 22, 2018.
Office Action from Canadian Application No. 2,773,477 dated Jun. 12, 2017.
Office Action from Canadian Application No. 2,783,246 dated May 16, 2018.
Office Action from U.S. Appl. No. 15/093,941 dated Jul. 12, 2018.
Notice of Allowance from U.S. Appl. No. 15/093,941 dated Jan. 31, 2019.
Office Action from U.S. Appl. No. 15/980,268 dated Jul. 27, 2018.
Office Action from U.S. Appl. No. 15/980,268 dated Jan. 30, 2019.
Notice of Allowance from U.S. Appl. No. 15/980,268 dated May 22, 2019.
Office Action from U.S. Appl. No. 15/147,141 dated May 31, 2018.
Notice of Allowance from U.S. Appl. No. 15/147,141 dated Sep. 14, 2018.
Office Action from U.S. Appl. No. 15/432,993 dated Sep. 17, 2018.
Notice of Allowance from U.S. Appl. No. 15/432,993 dated Mar. 1, 2019.
Office Action from U.S. Appl. No. 16/400,164 dated Apr. 29, 2020.
Office Action from U.S. Appl. No. 16/580,143 dated Mar. 19, 2020.
Notice of Allowance from U.S. Appl. No. 16/580,143 dated Apr. 16, 2020.
Notice of Allowance from U.S. Appl. No. 16/400,164 dated Aug. 6, 2020.
Office Action from U.S. Appl. No. 16/923,009 dated Oct. 1, 2020.
Notice of Allowance from U.S. Appl. No. 16/923,009 dated Feb. 19, 2021.

(56) References Cited

OTHER PUBLICATIONS

Office Action from U.S. Appl. No. 17/088,694 dated Nov. 24, 2021.
Notice of Allowance from U.S. Appl. No. 17/088,694 dated Mar. 9, 2022.
Office Action from U.S. Appl. No. 17/313,128 dated Apr. 8, 2022.
Notice of Allowance from U.S. Appl. No. 17/313,128 dated Jul. 22, 2022.
International Search Report from PCT/US06/030633 dated Nov. 28, 2006.
International Search Report from PCT/US07/007827 dated Aug. 29, 2007.
Office Action from U.S. Appl. No. 11/198,522 dated Apr. 17, 2007.
Interview Summary from U.S. Appl. No. 11/198,522 dated Jul. 25, 2007.
Office Action from U.S. Appl. No. 11/198,522 dated Oct. 31, 2007.
Office Action from U.S. Appl. No. 11/198,522 dated Feb. 20, 2008.
Interview Summary from U.S. Appl. No. 11/198,522 dated Aug. 11, 2008.
Office Action from U.S. Appl. No. 11/198,522 dated Sep. 30, 2008.
Office Action from U.S. Appl. No. 11/198,522 dated Aug. 4, 2009.
Office Action from U.S. Appl. No. 11/198,522 dated Mar. 4, 2010.
Notice of Allowance from U.S. Appl. No. 11/198,522 dated Oct. 5, 2010.
Office Action from U.S. Appl. No. 11/396,498 dated Aug. 21, 2009.
Office Action from U.S. Appl. No. 11/396,498 dated Mar. 18, 2010.
Office Action from U.S. Appl. No. 11/396,498 dated Jul. 8, 2010.
Advisory Action from U.S. Appl. No. 11/396,498 dated Sep. 30, 2010.
Interview Summary from U.S. Appl. No. 11/396,498 dated Oct. 20, 2010.
Office Action from U.S. Appl. No. 11/396,498 dated Aug. 23, 2011.
Office Action from U.S. Appl. No. 11/396,498 dated Dec. 21, 2011.
Notice of Allowance from U.S. Appl. No. 11/396,498 dated Feb. 12, 2013.
Notice of Allowance from U.S. Appl. No. 11/396,498 dated May 23, 2013.
Office Action from U.S. Appl. No. 11/997,657 dated Mar. 2, 2011.
Office Action from U.S. Appl. No. 11/997,657 dated Aug. 12, 2011.
Interview Summary from U.S. Appl. No. 11/997,657 dated Oct. 14, 2011.
Office Action from U.S. Appl. No. 11/997,657 dated Nov. 9, 2011.
Interview Summary from U.S. Appl. No. 11/997,657 dated Jan. 11, 2012.
Interview Summary from U.S. Appl. No. 11/997,657 dated Jan. 30, 2012.
Interview Summary from U.S. Appl. No. 11/997,657 dated Mar. 5, 2012.
Office Action from U.S. Appl. No. 11/997,657 dated Apr. 11, 2012.
Notice of Allowance from U.S. Appl. No. 11/997,657 dated May 9, 2012.
Office Action from U.S. Appl. No. 12/895,195 dated Dec. 22, 2010.
Office Action from U.S. Appl. No. 12/895,195 dated May 11, 2011.
Notice of Allowance from U.S. Appl. No. 12/895,195 dated Feb. 28, 2011.
Office Action from U.S. Appl. No. 12/895,195 dated Oct. 13, 2011.
Notice of Allowance from U.S. Appl. No. 12/895,195 dated Feb. 29, 2012.
Office Action from U.S. Appl. No. 13/036,200 dated Aug. 3, 2011.
Interview Summary from U.S. Appl. No. 13/036,200 dated Sep. 29, 2011.
Interview Summary from U.S. Appl. No. 13/036,200 dated Dec. 30, 2011.
Office Action from U.S. Appl. No. 13/036,200 dated Jan. 25, 2012.
Office Action from U.S. Appl. No. 13/036,200 dated May 15, 2012.
Interview Summary from U.S. Appl. No. 13/036,200 dated Jun. 27, 2012.
Notice of Allowance from U.S. Appl. No. 13/036,200 dated Jul. 17, 2012.
Notice of Allowance from U.S. Appl. No. 13/036,200 dated Feb. 5, 2013.
Notice of Allowance from U.S. Appl. No. 13/036,200 dated Sep. 3, 2013.
Office Action from U.S. Appl. No. 13/036,356 dated May 11, 2011.
Office Action from U.S. Appl. No. 13/036,356 dated Oct. 4, 2011.
Interview Summary from U.S. Appl. No. 13/036,356 dated Dec. 29, 2011.
Notice of Allowance from U.S. Appl. No. 13/036,356 dated Jan. 23, 2012.
Office Action from U.S. Appl. No. 13/097,810 dated Aug. 29, 2012.
Notice of Allowance from U.S. Appl. No. 13/097,810 dated Feb. 25, 2013.
Notice of Allowance from U.S. Appl. No. 13/097,810 dated Apr. 10, 2013.

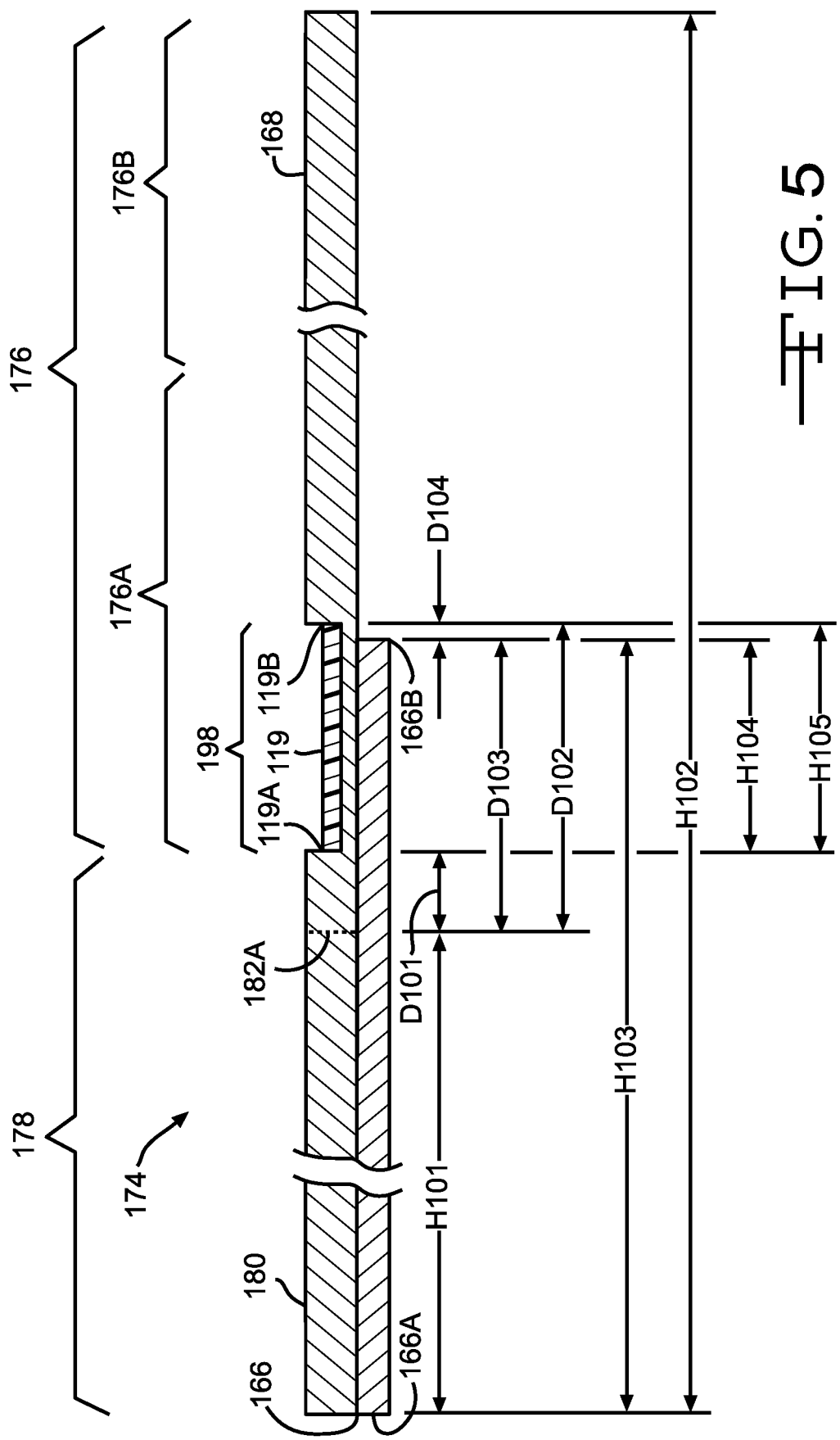

SHINGLE WITH REINFORCEMENT MEMBER

RELATED APPLICATIONS

This application is a continuation of U.S. Ser. No. 17/313,128, filed on May 6, 2021, titled SHINGLE WITH REINFORCEMENT MEMBER, which is a continuation of U.S. Ser. No. 16/923,009, filed on Jul. 7, 2020, titled SHINGLE WITH REINFORCEMENT MEMBER, now U.S. Pat. No. 11,028,589, which is a continuation application of U.S. Ser. No. 16/580,143, filed on Sep. 24, 2019, titled SHINGLE WITH REINFORCEMENT MEMBER, now U.S. Pat. No. 10,753,097, which is a continuation application of U.S. Ser. No. 15/980,268, filed on May 15, 2018, titled SHINGLE WITH REINFORCEMENT MEMBER, now U.S. Pat. No. 10,428,525, which is a continuation application of U.S. Ser. No. 15/590,222, filed on May 9, 2017, titled SHINGLE WITH REINFORCEMENT MEMBER, now U.S. Pat. No. 10,000,929, which is a continuation application of U.S. Ser. No. 15/093,925, filed on Apr. 8, 2016, titled SHINGLE WITH REINFORCED NAIL ZONE AND METHOD OF MANUFACTURING, now U.S. Pat. No. 9,657,478, which is a continuation application of U.S. Ser. No. 14/813,315, filed on Jul. 30, 2015, titled SHINGLE WITH REINFORCED NAIL ZONE AND METHOD OF MANUFACTURING, now U.S. Pat. No. 9,624,670, which is a continuation application of U.S. Ser. No. 14/267,956, filed May 2, 2014, titled SHINGLE WITH REINFORCEMENT NAIL ZONE AND METHOD OF MANUFACTURING, now U.S. Pat. No. 9,121,178, which is a continuation application of U.S. Ser. No. 14/105,913, filed Dec. 13, 2013, titled SHINGLE WITH REINFORCED NAIL ZONE AND METHOD OF MANUFACTURING, now U.S. Pat. No. 8,752,351, which is a continuation application of U.S. Ser. No. 13/097,810, filed Apr. 29, 2011, titled SHINGLE WITH REINFORCED NAIL ZONE AND METHOD OF MANUFACTURING, now U.S. Pat. No. 8,607,521, which is a continuation-in-part patent application of U.S. patent application Ser. No. 12/895,195, filed Sep. 30, 2010, titled SHINGLE WITH REINFORCED NAIL ZONE AND METHOD OF MANUFACTURING, now U.S. Pat. No. 8,181,413, which is a continuation of U.S. Ser. No. 11/198,522, filed Aug. 5, 2005, titled SHINGLE WITH REINFORCED NAIL ZONE AND METHOD OF MANUFACTURING, now U.S. Pat. No. 7,836,654, the entire disclosures of which are incorporated herein by reference.

TECHNICAL FIELD

This invention relates to a shingle, such as a roofing shingle, and in particular, to a roofing shingle having an improved nail zone.

BACKGROUND OF THE INVENTION

Asphalt-based roofing materials, such as roofing shingles, roll roofing and commercial roofing, are installed on the roofs of buildings to provide protection from the elements, and to give the roof an aesthetically pleasing look. Typically, the roofing material is constructed of a substrate such as a glass fiber mat or an organic felt, an asphalt coating on the substrate, and a surface layer of granules embedded in the asphalt coating.

A common method for the manufacture of asphalt shingles is the production of a continuous sheet of asphalt material followed by a shingle cutting operation, which cuts the material into individual shingles. In the production of asphalt sheet material, either a glass fiber mat or an organic felt mat is passed through a coater containing hot liquid asphalt to form a tacky, asphalt coated sheet. Subsequently, the hot asphalt coated sheet is passed beneath one or more granule applicators, which discharge protective and decorative surface granules onto portions of the asphalt sheet material.

In certain types of shingles, it is especially desired that the shingles define a sufficiently wide area, often known in the industry as the "nail zone," in order to make installation of roofs using shingles, such as laminated shingles, more efficient and secure. One or more lines or other indicia painted or otherwise marked longitudinally on the surface of the shingle may define such a nail zone. It is especially desired that the shingles define a nail zone that allows the installers to have some latitude in the nail placement.

Additionally, the leading edge of some shingles may experience lift off in high wind situations. Therefore, there is also a need for shingles where the shingles have a sufficiently high nail pull-through value so that the installed shingles have improved performance in high wind situations.

SUMMARY OF THE INVENTION

In an exemplary embodiment of the present application, a roofing shingle includes an overlay sheet, an underlay sheet, and a reinforcement member. The overlay sheet includes a headlap portion and a tab portion, wherein the overlay sheet has an overlay sheet height. The underlay sheet is secured to a bottom surface of the overlay sheet such that a region of the underlay sheet overlaps a region of the headlap portion of the overlay sheet. The reinforcement material is secured to a top surface of the headlap portion of the overlay sheet, wherein the reinforcement material is configured to improve nail pull-through, wherein the reinforcement material extends beyond the overlapping regions of the headlap portion and the underlay sheet.

In another exemplary embodiment of the present application, a method of making a laminated shingle is contemplated. In the exemplary method, a shingle mat is coated with roofing asphalt to make an asphalt-coated sheet. A reinforcement material is adhered to a portion of an upper surface of the asphalt-coated sheet. The asphalt-coated sheet is divided into an overlay sheet and an underlay sheet, wherein the overlay sheet has a tab portion normally exposed on a roof and a headlap portion normally covered-up on a roof, the headlap portion having a lower zone adjacent the tab portion and an upper zone adjacent the lower zone, wherein the reinforcement material is adhered to the lower zone of the headlap portion. The underlay sheet is secured to a bottom surface of the overlay sheet to form the laminated shingle, such that a region of the underlay sheet overlaps a region of the headlap portion of the overlay sheet, and such that the reinforcement material extends beyond the overlapping regions of the headlap portion and the underlay sheet. The reinforcement material is configured to improve nail pull-through of the laminated shingle.

Various objects and advantages of this invention will become apparent to those skilled in the art from the following detailed description of the various embodiments, when read in light of the accompanying drawings.

BRIEF DESCRIPTION OF THE DRAWINGS

FIG. 5 is a cross-sectional view, in elevation, of a second embodiment of a laminated shingle having reinforcement material.

DETAILED DESCRIPTION OF THE INVENTION

Figure 1:
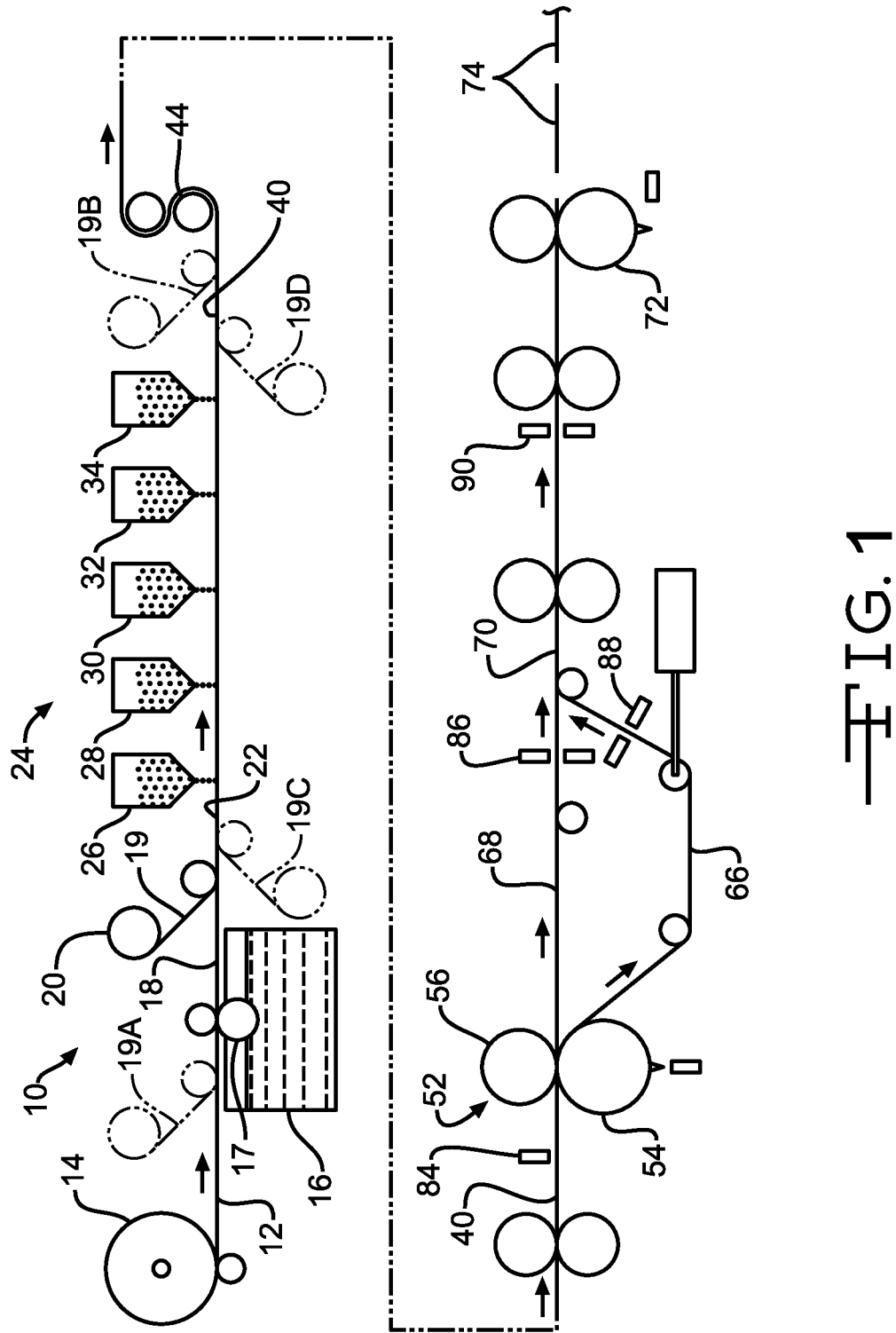
FIG. 1 is a schematic elevational view of an apparatus for making shingles according to the invention.

Referring now to the drawings, there is shown in FIG. 1 an apparatus 10 for manufacturing an asphalt-based roofing material according to the invention. In the illustrated embodiment, the manufacturing process involves passing a continuous sheet 12 in a machine direction (indicated by the arrows) through a series of manufacturing operations. The sheet usually moves at a speed of at least about 200 feet/minute (61 meters/minute), and typically at a speed within the range of between about 450 feet/minute (137 meters/minute) and about 800 feet/minute (244 meters/minute). The sheet, however, may move at any desired speed.

In a first step of the illustrated manufacturing process, a continuous sheet of substrate or shingle mat 12 is payed out from a roll 14. The substrate can be any type known for use in reinforcing asphalt-based roofing materials, such as a non-woven web of glass fibers. The shingle mat 12 may be fed through a coater 16 where an asphalt coating is applied to the mat 12. The asphalt coating can be applied in any suitable manner. In the illustrated embodiment, the mat 12 contacts a roller 17, that is in contact with a supply of hot, melted asphalt. The roller 17 completely covers the mat 12 with a tacky coating of hot, melted asphalt to define a first asphalt coated sheet 18. In other embodiments, however, the asphalt coating could be sprayed on, rolled on, or applied to the sheet by other means. Typically, the asphalt material is highly filled with a ground stone filler material, amounting to at least about 60 percent by weight of the asphalt/filler combination.

A continuous strip of a reinforcement material or tape 19, as will be described in detail herein, may then be payed out from a roll 20. The reinforcement tape 19 adheres to the first asphalt coated sheet 18 to define a second asphalt coated sheet 22. In one embodiment, the reinforcement tape 19 is attached to the sheet 18 by the adhesive mixture of the asphalt in the first asphalt coated sheet 18. The reinforcement tape 19, however, may be attached to the sheet 18 by any suitable means, such as other adhesives. In one embodiment, the tape 19 is formed from polyester. In another embodiment, the tape 19 is formed from polyolefin, such as polypropylene or polyethylene. The tape 19, however, can be formed from any material for reinforcing and strengthening the nail zone of a shingle, such as, for example, paper, film, scrim material, and woven or non-woven glass.

The resulting second asphalt coated sheet 22 may then be passed beneath a series of granule dispensers 24 for the application of granules to the upper surface of the second asphalt coated sheet 22. The granule dispensers can be of any type suitable for depositing granules onto the asphalt coated sheet. A granule dispenser that can be used is a granule valve of the type disclosed in U.S. Pat. No. 6,610,147 to Aschenbeck. The initial granule blender 26 may deposit partial blend drops of background granules of a first color blend on the tab portion of the second asphalt coated sheet 22 in a pattern that sets or establishes the trailing edge of subsequent blend drops of a second color blend (of an accent color) and a third color blend (of a different accent color). For purposes of this patent application, the first color blend and the background granules are synonymous. The use of initially applied partial blend drops to define the trailing edge of subsequent blend drops is useful where accurate or sharp leading edges are possible, but accurate trailing edges at high shingle manufacturing speeds are difficult.

As is well known in the art, blend drops applied to the asphalt coated sheet are often made up of granules of several different colors. For example, one particular blend drop that is supposed to simulate a weathered wood appearance might actually consist of some brown granules, some dark gray granules, and some light gray granules. When these granules are mixed together and applied to the sheet in a generally uniformly mixed manner, the overall appearance of weathered wood is achieved. For this reason, the blend drops are referred to as having a color blend, which gives an overall color appearance. This overall appearance may be different from any of the actual colors of the granules in the color blend. Also, blend drops of darker and lighter shades of the same color, such as, for example, dark gray and light gray, are referred to as different color blends rather than merely different shades of one color.

As shown in FIG. 1, the series of dispensers 24 includes four color blend blenders 26, 28, 30, and 32. Any desired number of blenders, however, can be used. The final blender may be the background blender 34. Each of the blenders may be supplied with granules from sources of granules, not shown. After the blend drops are deposited on the second asphalt coated sheet 22, the remaining, uncovered areas are still tacky with warm, uncovered asphalt, and the background granules from the background blender 34 will adhere to the areas that are not already covered with blend drop granules. After all the granules are deposited on the second asphalt coated sheet 22 by the series of dispensers 24, the sheet 22 becomes a granule covered sheet 40.

Figure 2:
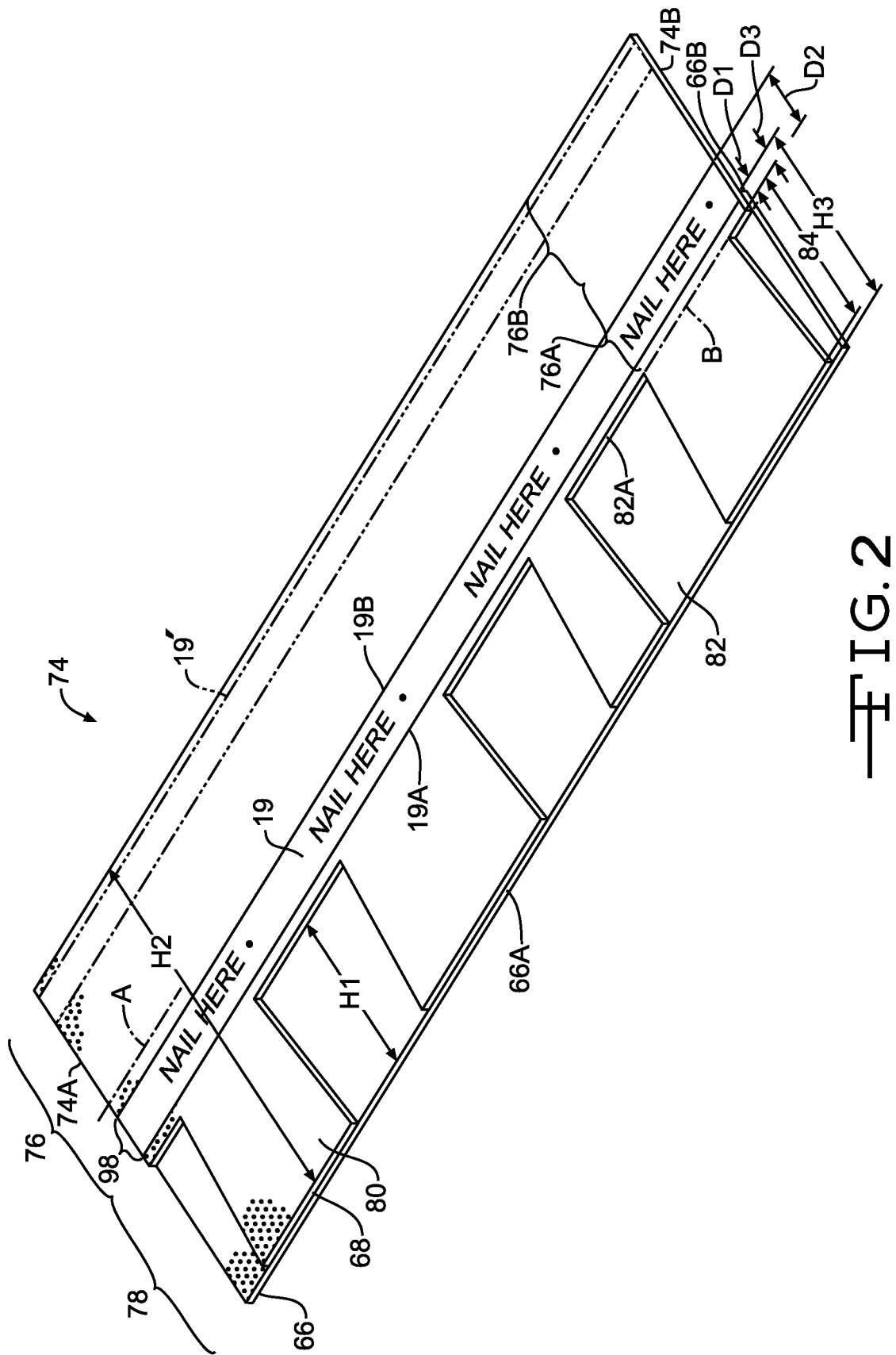
FIG. 2 is a perspective view of a laminated shingle having a reinforcement member in accordance with this invention.

In one embodiment, the reinforcement tape 19 includes an upper surface to which granules substantially will not adhere. The reinforcement tape 19, however, may include an upper surface to which granules will adhere. For example, the apparatus 10 may include any desired means for depositing granules onto substantially the entire second asphalt coated sheet 22, except for the portion of the second asphalt coated sheet 22 covered by the tape 19, as best shown in FIG. 2. Alternately, granules may be deposited onto substantially the entire second asphalt coated sheet 22, including the tape 19, but wherein the reinforcement tape 19 includes an upper surface to which granules substantially will not adhere.

The granule covered sheet 40 may then be turned around a slate drum 44 to press the granules into the asphalt coating and to temporarily invert the sheet so that the excess granules will fall off and will be recovered and reused. Typically, the granules applied by the background blender 34 are made up by collecting the backfall granules falling from the slate drum 44.

The granule covered sheet 40 may subsequently be fed through a rotary pattern cutter 52, which includes a bladed cutting cylinder 54 and a backup roll 56, as shown in FIG. 1. If desired, the pattern cutter 52 can cut a series of cutouts in the tab portion of the granule covered sheet 40, and cut a series of notches in the underlay portion of the granule covered sheet 40.

The pattern cutter 52 may also cut the granule covered sheet 40 into a continuous underlay sheet 66 and a continuous overlay sheet 68. The underlay sheet 66 may be directed to be aligned beneath the overlay sheet 68, and the two sheets may be laminated together to form a continuous laminated sheet 70. As shown in FIG. 1, the continuous underlay sheet 66 may be routed on a longer path than the path of the continuous overlay sheet 68. Further downstream, the continuous laminated sheet 70 may be passed into contact with a rotary length cutter 72 that cuts the laminated sheet into individual laminated shingles 74.

In order to facilitate synchronization of the cutting and laminating steps, various sensors and controls may be employed. For example, sensors, such as photo eyes 86 and 88 can be used to synchronize the continuous underlay sheet 66 with the continuous overlay sheet 68. Sensors 90 can also be used to synchronize the notches and cutouts of the continuous laminated sheet with the end cutter or length cutter 72.

In one embodiment, the reinforcement tape may be attached to the shingle mat 12 prior to the application of the asphalt coating, as shown at 19A in FIG. 1. The tape 19A may be attached to the shingle mat 12 by any suitable means, such as hot, melted asphalt, or other adhesives.

In another embodiment, the reinforcement tape may be attached to the granule covered sheet 40, as shown at 19B in FIG. 1. The tape 19B may be attached to the granule covered sheet 40 by any suitable means, such as hot, melted asphalt, or other adhesives.

In another embodiment, the reinforcement tape may be attached to a lower surface (downwardly facing as viewed in FIG. 1) of the mat 12, the first asphalt coated sheet 18, the second asphalt coated sheet 22, or the granule covered sheet 40, as shown at 19C and 19D in FIG. 1. The tape 19C may be attached to the mat 12, the first asphalt coated sheet 18, the second asphalt coated sheet 22, or the granule covered sheet 40 by any suitable means, such as hot, melted asphalt, other adhesives, or suitable fasteners. In such an embodiment, the reinforcement tape 19C and 19D may be attached to the lower surface of the nail zone of either of the overlay sheet 68 or the underlay sheet 66, thereby reinforcing and strengthening the nail zone as described herein.

It will be understood, however, that in any of the embodiments described herein, reinforcement material may be applied as an extruded or liquid material, such as a polymer, that will adhere to the mat 12, the first sheet 18, the second sheet 22, the granule covered sheet 40, or the lower surface of the underlay sheet 66 or the overlay sheet 68. Additionally, the reinforcement material may be applied to the laminated roofing shingle 74, as described below.

Referring now to FIG. 2, a laminated roofing shingle is shown generally at 74. In the illustrated embodiment, the shingle 74 includes the overlay sheet 68 attached to the underlay sheet 66 and has a first end 74A and a second end 74B. The shingle 74 also includes a longitudinal axis A. The overlay sheet 68 may include a headlap portion 76 and a tab portion 78. The headlap portion 76 may include a lower zone 76A and an upper zone 76B. The tab portion 78 defines a plurality of tabs 80 and cutouts 82 between adjacent tabs 80. In the illustrated embodiment, the tab portion 78 includes four tabs 80, although any suitable number of tabs 80 may be provided. The headlap portion 76 and the tabs 80 may include one or more granule patterns thereon. Each cutout 82 has a first height H1. In the illustrated embodiment, the cutouts 82 are shown as having the same height H1. It will be understood however, that each cutout 82 may be of different heights. A line B is collinear with an upper edge 82A of the cutouts 82 and defines an upper limit of an exposed region 84 of the underlay sheet 66. In the illustrated embodiment, the height of the exposed region 84 is equal to the first height H1, although the height of the exposed region 84 may be any desired height. In a shingle wherein the cutouts 82 have different heights, the line B may be collinear with an upper edge 82A of the cutout 82 having the largest height. In the illustrated embodiment, the overlay sheet 68 has a second height H2.

The reinforcement tape 19 may be disposed longitudinally on the headlap portion 76. In the illustrated embodiment, the tape 19 extends longitudinally from the first end 74A to the second end 74B of the shingle 74 within the lower zone 76A of the headlap portion 76. A lower edge 19A of the tape 19 may be spaced apart from the line B by a distance D1, and an upper edge 19B of the tape 19 may be spaced apart from the line B by a distance D2. In one embodiment, the distance D1 is within the range of from about ¼ inch to about ¾ inch. In another embodiment, the distance D1 is about ½ inch. In one embodiment, the distance D2 is within the range of from about 1¾ inches to about 2¼ inches. In another embodiment, the distance D2 is about 2 inches. The distances D1 and D2 may, however, be of any other desired length. For example, if desired, the tape 19 may substantially cover the entire headlap portion 76 of the overlay sheet 68. It will be further understood, however, that one or more additional lengths of tape may be disposed longitudinally on the headlap portion 76, such as shown by the phantom line 19' in FIG. 2. It will be understood that the reinforcement material need not extend from the first end 74A to the second end 74B of the shingle 74, and may be disposed in one or more sections or portions on the shingle 74.

The tape 19 defines a nail zone 98 and may include text such as "nail here .cndot.", as shown in FIG. 2. It will be understood, however, that any other text or other indicia may be included on the tape 19. It will also be understood that the tape 19 can be provided without such text or indicia. Such indicia on the tape 19 ensure that the nail zone 98 may be easily and quickly identified by the shingle installer.

In the embodiment illustrated in FIG. 2, the underlay sheet 66 includes a leading edge 66A and a trailing edge 66B and has a third height H3. In the illustrated embodiment, the trailing edge 66B of the underlay sheet 66 is spaced apart from the line B by a distance D3. As shown, the distance D3 is about ⅜ inch, however, the distance D3 may be any desired distance.

In the illustrated embodiment, the third height H3 of the underlay sheet 66 is less than one-half the second height H2 of the overlay sheet 68. The overlay sheet 68 and the underlay sheet 66 thereby define a two-layer portion of the laminated shingle 74 and a single-layer portion of the laminated shingle 74, wherein at least a portion of the tape 19 is adhered to the single-layer portion of the laminated shingle 74. Alternately, the third height H3 of the underlay sheet 66 may be equal to one-half the second height H2 of the overlay sheet 68, or greater than one-half of the second height H2 of the overlay sheet 68. Such a relationship between the underlay sheet 66 and the overlay sheet 68 allows the tape 19 to be positioned such that a reinforced nail zone is provided at a substantially single-layer portion of the shingle 74.

In another embodiment of the invention, a layer of material, such as talc or sand, may be applied to the first asphalt coated sheet 18 shown in FIG. 1. The material may be applied by any desired means to an upper surface of the first asphalt coated sheet 18. In one embodiment, the material may be applied to the portion of the first asphalt coated sheet 18 that will become the portion of the overlay sheet 66 shown covered by the tape 19 in FIG. 2. Such a material may reduce tackiness of the portions of the second asphalt coated sheet 22 to which the material has been applied, and thereby provide a surface to which granules substantially will not adhere.

In the exemplary shingle 74 illustrated in FIG. 2, the shingle 74 may have a nail pull-through value, measured in accordance with a desired standard, such as prescribed by ASTM test standard D3462. For example, the shingle 74 may have a nail pull-through value that is greater than in an otherwise identical shingle having no such tape 19. In one embodiment, the shingle 74 may have a nail pull-through value within the range of from about ten percent to about 100 percent greater than in an otherwise identical shingle having no such tape 19. In another embodiment, the shingle 74 may have a nail pull-through value about 50 percent greater than in an otherwise identical shingle having no such tape 19.

In another embodiment, a shingle having a reinforcement tape 19 formed from polyester film having a thickness of about 0.5 mils, may have a nail pull-through value about 13.3 percent greater than in an otherwise identical shingle having no such tape 19.

In another embodiment, a shingle having a reinforcement tape 19 formed from polyester film having a thickness of about 3.0 mils, may have a nail pull-through value about 62.3 percent greater than in an otherwise identical shingle having no such tape 19.

In another embodiment, a shingle having a reinforcement tape 19 formed from polyester film having a thickness of about 4.0 mils, may have a nail pull-through value about 86.0 percent greater than in an otherwise identical shingle having no such tape 19.

In another embodiment, a shingle having a reinforcement tape 19 formed from polyester film having a thickness of about 5.0 mils, may have a nail pull-through value about 112.7 percent greater than in an otherwise identical shingle having no such tape 19.

Because there may be substantially no granules in the portion of the overlay sheet 68 covered by the tape 19, the weight of the shingle 74 may be reduced relative to an otherwise identical shingle having no such tape 19. For example, the weight of the exemplary shingle 74 illustrated in FIG. 2, may be reduced within the range of from about four percent to about six percent relative to the weight of an otherwise identical shingle having no such tape 19. The material and transportation cost may also be reduced.

Although the invention has been disclosed in the context of a laminated shingle 74, it will be understood that the reinforcement tape 19 may be attached to any other type of shingle, such as a single layer shingle.

Figure 3:
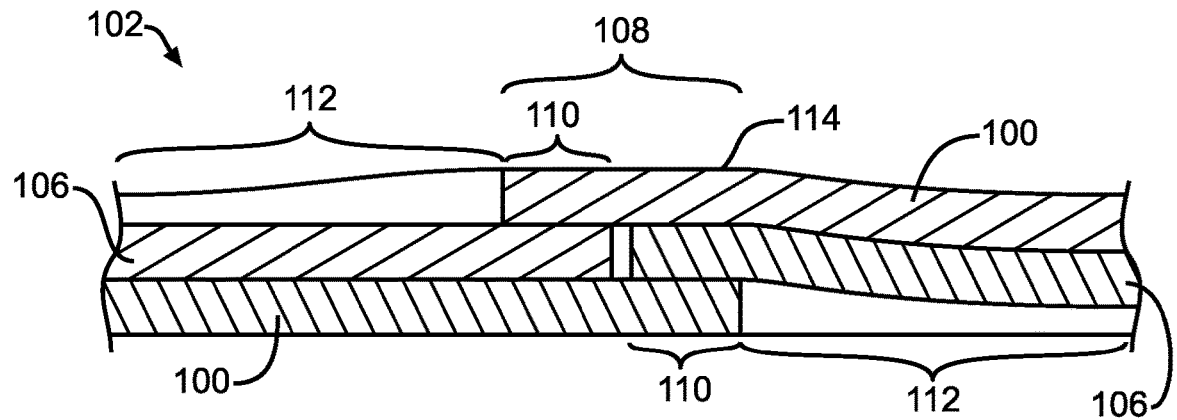
FIG. 3 is a schematic sectional view of a pair of laminated roofing shingles of the prior art stacked together, shown in exaggerated thickness to illustrate humping of the stacked shingles.

As shown in FIG. 3, laminated roofing shingles 100 of the prior art are stacked in a bundle 102. Only a pair of such shingles 100 are illustrated in FIG. 3, with every other shingle 100 inverted and turned 180 degrees. It will be understood, however, that the shingles 100 may be stacked such that every other of such shingles 100 are either inverted or turned 180 degrees, or both. This stacking method minimizes uneven build in the bundle 102 caused by the difference in thickness between the area of the shingle 100 that includes the underlay sheet 106 and the area that does not include the underlay sheet 106. A problem may occur, however, along a central area 108 of the bundle 102 because central areas 110 of the shingles 100 are double-layered, whereas the cutout portions 112 of the shingles 100 adjacent the central areas 110 are single-layered. The difference in thickness causes a ridge or hump 114 along the central area 108 of the bundle 102 that becomes progressively higher as the number of shingles 100 in the bundle 102 increases.

Figure 4:
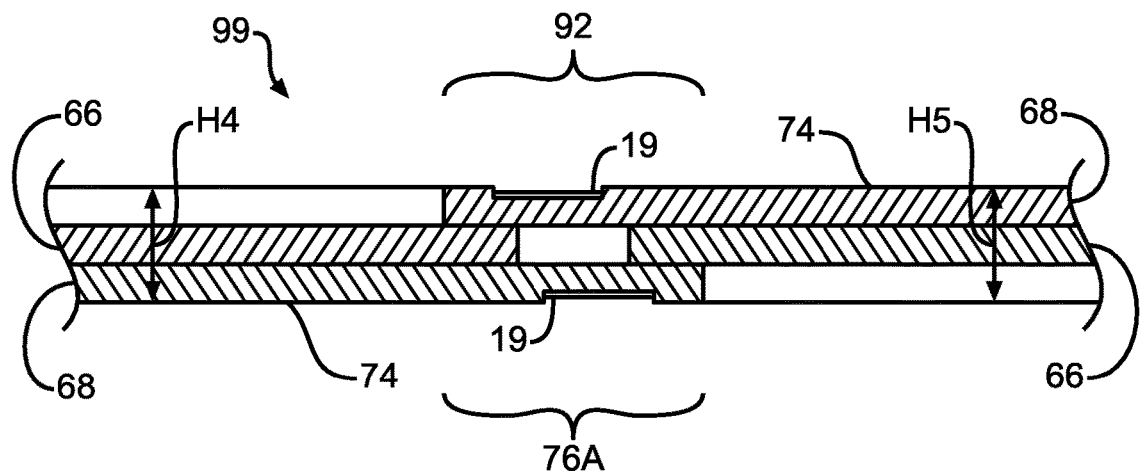
FIG. 4 is a schematic sectional view of a pair of laminated roofing shingles according to the invention stacked together, shown in exaggerated thickness to illustrate how the reinforcement members of adjacent shingles cooperate to reduce humping of the stacked shingles.

FIG. 4 is a schematic sectional view of a representative pair of stacked shingles 74 manufactured according to the present invention. As shown in FIG. 4, the laminated roofing shingles 74 are stacked such that every other of the shingles 74 is inverted and turned 180 degrees relative to an adjacent one of the shingles 74 to define a bundle 99. It will be understood, however, that the shingles 74 may be stacked such that every other of such shingles 74 are either inverted or turned 180 degrees, or both. The bundle 99 includes a central area 92. In the illustrated embodiment, the central area 92 includes the lower zones 76A and reinforcement tape 19 of each shingle 74, and includes the portion of each laminated roofing shingle 74 wherein the shingle 74 is double-layered. In contrast to the prior art shingles 100, when the laminated shingles 74 of the invention are stacked, the areas of the adjacent shingles 74 having no granules, such as the areas covered by the reinforcement tapes 19, cooperate to advantageously reduce humping in the central area 92 of the bundle of stacked shingles 74. As best shown in FIG. 4, the central area 92 of the bundle, as represented by the pair of shingles 74 illustrated, has a fourth height H4 substantially identical to a fifth height H5 of a remainder of the bundle outside of the central area 92.

Referring now to FIG. 5, a second embodiment of a laminated roofing shingle is shown generally at 174. In the illustrated embodiment, the shingle 174 includes an overlay sheet 168 attached to an underlay sheet 166. In the illustrated embodiment, the overlay sheet 168 and the underlay sheet 166 are the same as, or similar to, the overlay sheet 68 and the underlay sheet 66 described above and illustrated in FIG. 2. In other embodiments, the overlay sheet 168 and the underlay sheet 166 can be different from the overlay sheet 68 and the underlay sheet 66. The shingle 174 has a first end (not shown) and a second end (not shown). In the illustrated embodiment, the first and second ends of the shingle 174 are the same as, or similar to, the first end 74A and the second end 74B described above and illustrated in FIG. 2. In other embodiments, the first and second ends of the shingle 174 can be different from the first end 74A and the second end 74B. The shingle 174 also includes a longitudinal axis extending from the first end to the second end. In the illustrated embodiment, the longitudinal axis is the same as, or similar to, the longitudinal axis A described above and illustrated in FIG. 2. In other embodiments, the longitudinal axis of the shingle 174 can be different from the longitudinal axis A.

Referring again to FIG. 5, the overlay sheet 168 may include a headlap portion 176 and a tab portion 178. The headlap portion 176 may include a lower zone 176A and an upper zone 176B. The tab portion 178 defines a plurality of tabs 180 and cutouts (not shown) between adjacent tabs 180. Any suitable number of tabs 180 and cutouts may be provided. The headlap portion 176 may include any type of granule applied thereon, including headlap granules. The tabs 180 may include one or more granule patterns applied thereon. In the illustrated embodiment, the shingle 174 can be formed in the same manner, or in a similar, manner to the manufacturing process described above and illustrated in FIG. 1. In other embodiments, the shingle 174 can be formed with other desired processes.

Referring again to FIG. 5, each cutout has a first height H101. It should be understood that the cutouts may be of the same first height H101 or different cutouts can have different first heights H101. The cutouts have an upper edge 182A that defines an upper limit of an exposed region (not shown) of the underlay sheet 166. In the illustrated embodiment, the height of the exposed region is equal to the first height H101, although the height of the exposed region may be any desired height. In a shingle wherein the cutouts have different heights, the upper edge 182A occurs with the cutout having the largest first height H101. In the illustrated embodiment, the overlay sheet 168 has a second height H102.

A reinforcement material 119 may be disposed longitudinally on the headlap portion 176. The reinforcement material 119 is configured to increase the pull-through of the nail zone in the same manner as the tape 19 described above and illustrated in FIG. 2. In the illustrated embodiment, the reinforcement material 119 is formed from woven fabric made from a polymeric material, such as the non-limiting example of polyethylene terephthalate (PET). In other embodiments, the reinforcement material 119 can be formed from other woven polymeric materials, such as for example, polyester, polyolefin or polypropylene. In still other embodiments, the reinforcement material 119 can be formed from any material configured to reinforce and strengthen the nail zone of a shingle, including the non-limiting example of paper, film, scrim material, and woven or non-woven glass.

In the illustrated embodiment, the reinforcement material 119 extends longitudinally from the first end to the second end of the shingle 174 within the lower zone 176A of the headlap portion 176. A lower edge 119A of the reinforcement material 119 may be spaced apart from the upper edge 182A of the cutouts by a first distance D101, and an upper edge 119B of the reinforcement material 119 may be spaced apart from the upper edge 182A of the cutouts by a second distance D102. In one embodiment, the first distance D101 is within the range of from about 0.06 inches to about 0.75 inches. In another embodiment, the first distance D101 is about 0.25 inches. In one embodiment, the second distance D102 is within the range of from about 1.06 inches to about 1.75 inches. In another embodiment, the second distance D102 is about 1.50 inches. The first and second distances, D101 and D102, may however, be of any other desired length. For example, if desired, the reinforcement material 119 may substantially cover the entire headlap portion 176 of the overlay sheet 168. It should be understood, however, that one or more additional lengths of reinforcement material may be disposed longitudinally on the headlap portion 176, such as shown in FIG. 2 by the phantom line 19'. In addition, the reinforcement material 119 need not extend from the first end to the second end of the shingle 174, and may be disposed in one or more sections or portions on the shingle 174.

The reinforcement material 119 defines a nail zone 198 and may include text or other indicia such as described above for the tape 19 as shown in FIG. 2.

In the embodiment illustrated in FIG. 5, the underlay sheet 166 includes a lower edge 166A and an upper edge 166B. The distance from the lower edge 166A to the upper edge 166B defines a third height H103. The upper edge 166B of the underlay sheet 166 is spaced apart from the upper edge 182A by a third distance D103. In the illustrated embodiment, the third distance D103 is within the range of from about 1.06 inches to about 1.75 inches. In another embodiment, the third distance D103 is about 1.38 inches. However, the third distance D103 may be any desired distance.

Referring again to FIG. 5, the upper edge 166B of the underlay sheet 166 is spaced apart from the upper edge 119B of the reinforcement material 119 by a fourth distance D104. In the illustrated embodiment, the fourth distance D104 is within the range of from about 0.06 inches to about 0.50 inches. In another embodiment, the fourth distance D104 is about 0.12 inches. In still other embodiments, the fourth distance D104 can be zero. However, the fourth distance D104 may be any desired distance.

In the illustrated embodiment, the third height H103 of the underlay sheet 166 is approximately one-half of the second height H102 of the overlay sheet 168. The overlay sheet 168 and the underlay sheet 166 thereby define a two-layer portion of the laminated shingle 174 and a single-layer portion of the laminated shingle 174. Such a dimensional relationship between the underlay sheet 166 and the overlay sheet 168 allows the reinforcement material 119 to be positioned such that the nail zone 198 can extend near or over the single-layer portion of the shingle 74. The two-layer portion of the laminated shingle 174 that is covered by the reinforcement material 119 has a fourth height H104. In the illustrated embodiment, the fourth height H104 is in a range of from about 1.00 inches to about 1.75 inches. In other embodiments, the fourth height H104 can be other dimensions less than about 1.00 inches or more than about 1.75 inches.

Referring again to FIG. 5, the reinforcement material 119 has a fifth height H105. In the illustrated embodiment, the fifth height H105 is within the range of from about 1.06 inches to about 1.87 inches. In another embodiment, the fifth height H105 is about 1.38 inches. However, the fifth height H105 may be any desired distance.

As discussed above, the relationship of the fourth height H104 and the fifth height H105 defines in part the extent to which the reinforcement material 119 extends beyond the two-layer portion of the shingle 174 and into the single layer portion of the shingle. In this regard, the term "coverage", as used herein, is defined to mean the percentage of the reinforcement material 119 that covers the two-layer portion of the shingle 174. In other words, coverage is the ratio of the fourth height H104 to the fifth height H105. As one example, a fourth height H104 of 1.12 inches and a fifth height H105 of 1.25 inches provides a ratio of 90%, meaning the 90% of the reinforcement material 119 is positioned to cover the two-layer portion of the shingle 174. In the illustrated embodiment, the coverage of the reinforcement material 119 is in a range of from about 70% to about 100%. In other embodiments, the coverage can be in a range of from about 80% to about 95%. In still other embodiments, the coverage can be in a range of from about 85% to about 90%.

In the embodiment illustrated in FIG. 5, the shingle 174 may have a nail pull-through value that is the same as, or similar to, the nail pull-through value for the shingle 74 as described above and as shown in FIG. 2. Alternatively, the shingle 174 can have a nail pull-through value that is different from the nail pull-through value for the shingle 74.

In another embodiment, a shingle 174 having a reinforcement material 119 formed from woven polymeric materials having a thickness of about 0.5 mils, may have a nail pull-through value at least about 13 percent greater than in an otherwise identical shingle having no such reinforcement material 119.

In another embodiment, a shingle having a reinforcement material 119 formed from woven polymeric materials having a thickness of about 3.0 mils, may have a nail pull-through value about 62 percent greater than in an otherwise identical shingle having no such reinforcement material 119.

In another embodiment, a shingle having a reinforcement material 119 formed from woven polymeric materials having a thickness of about 4.0 mils, may have a nail pull-through value about 86 percent greater than in an otherwise identical shingle having no such reinforcement material 119.

In another embodiment, a shingle having a reinforcement material 119 formed from woven polymeric materials having a thickness of about 5.0 mils, may have a nail pull-through value about 112 percent greater than in an otherwise identical shingle having no such reinforcement material 119.

Because there may be substantially no granules in the portion of the overlay sheet 168 covered by the reinforcement material 119, the weight of the shingle 174 may be reduced relative to an otherwise identical shingle having no such reinforcement material 119. For example, the weight of the exemplary shingle 174 illustrated in FIG. 5, may be reduced within the range of from about four percent to about six percent relative to the weight of an otherwise identical shingle having no such reinforcement material 119. The material and transportation cost may also be reduced.

Although the invention has been disclosed in the context of a laminated shingle 174, it will be understood that the reinforcement material 119 may be attached to any other type of shingle, such as a single layer shingle.

The principle and mode of operation of this invention have been described in its various embodiments. However, it should be noted that this invention may be practiced otherwise than as specifically illustrated and described without departing from its scope.

We claim:

1. A method of applying shingles to a roof, the method comprising:
    providing first and second shingles, each including:
        an overlay sheet including a headlap portion and a tab portion;
        an underlay sheet secured to a bottom surface of the overlay sheet such that a region of the underlay sheet overlaps a region of the headlap portion of the overlay sheet; and
        a reinforcement material secured to a top surface of the headlap portion of the overlay sheet, wherein the reinforcement material is configured to improve nail pull-through, wherein the reinforcement material extends beyond the overlapping regions of the headlap portion and the underlay sheet;
    securing the first shingle to the roof by installing fasteners through the reinforced nail zone of the first shingle;
    placing the second shingle onto the first shingle such that the leading edge of the underlay sheet of the second shingle is aligned with a lower edge of the headlap portion of the first shingle; and
    securing the second shingle to the roof by installing fasteners through the reinforced nail zone of the second shingle.

2. The method of claim 1, wherein the reinforcement material of each of the first and second shingles extends beyond the overlapping regions of the headlap portion and the underlay sheet a maximum distance of about 0.12 inches.

3. The method of claim 1, wherein the underlay sheet of each of the first and second shingles has a substantially uniform thickness.

4. The method of claim 1, wherein the overlay sheet of each of the first and second shingles has a non-uniform thickness.

5. The method of claim 1, further including a plurality of granules secured to the headlap portion of the overlay sheet of each of the first and second shingles and not secured to the reinforcement material.

6. The method of claim 1, wherein the reinforcement material and the headlap portion of each of the first and second shingles provide a nail pull-through value that is at least 13 percent greater than an otherwise identical shingle having no such reinforcement material.

7. The method of claim 1, wherein the reinforcement material of each of the first and second shingles is formed from a woven material.

8. The method of claim 1, wherein the reinforcement material of each of the first and second shingles is formed from a polymeric material.

9. The method of claim 1, wherein each of the first and second shingles provides an average nail pull-through value of 90 newtons when measured at a temperature of 23° C.+/−2° C.

10. A roof covering comprising:
    first and second shingles each comprising:
        an overlay sheet including a headlap portion and a tab portion;
        an underlay sheet secured to a bottom surface of the overlay sheet such that a region of the underlay sheet overlaps a region of the headlap portion of the overlay sheet; and
        a reinforcement material secured to a top surface of the headlap portion of the overlay sheet, wherein the reinforcement material is configured to improve nail pull-through, wherein the reinforcement material extends beyond the overlapping regions of the headlap portion and the underlay sheet;
    wherein the first shingle is secured to the roof by fasteners installed through the reinforcement material of the first shingle; and
    wherein the second shingle is secured onto the first shingle such that the leading edge of the underlay sheet of the second shingle is aligned with a lower edge of the headlap portion of the first shingle; and
    wherein the second shingle is secured to the roof by fasteners installed through the reinforcement material of the second shingle and through the headlap portion of the first shingle.

11. The roof covering of claim 10, wherein the reinforcement material of each of the first and second shingles extends beyond the overlapping regions of the headlap portion and the underlay sheet a maximum distance of about 0.12 inches.

12. The roof covering of claim 10, wherein the underlay sheet of each of the first and second shingles has a substantially uniform thickness.

13. The roof covering of claim 10, wherein the overlay sheet of each of the first and second shingles has a non-uniform thickness.

14. The roof covering of claim 10, further including a plurality of granules secured to the headlap portion of the overlay sheet of each of the first and second shingles and not secured to the reinforcement material.

15. The roof covering of claim 10, wherein the reinforcement material and the headlap portion of each of the first and second shingles provide a nail pull-through value that is at least 13 percent greater than an otherwise identical shingle having no such reinforcement material.

16. The roof covering of claim 10, wherein the reinforcement material of each of the first and second shingles is formed from a woven material.

17. The roof covering of claim 10, wherein the reinforcement material of each of the first and second shingles is formed from a polymeric material.

18. The roof covering of claim 10, wherein each of the first and second shingles provides an average nail pull-through value of 90 newtons when measured at a temperature of 23° C.+/−2° C.

19. The roof covering of claim 10, wherein a ratio of a height of the overlapping regions to a height of the reinforcement material of each of the first and second shingles is in a range of from about 70% to about 100%.

20. The roof covering of claim 10, wherein the tab portion of the overlay sheet of each of the first and second shingles includes a plurality of cutouts, wherein the distance from an upper edge of the plurality of the cutouts to a lower edge of the reinforcement material is about 0.25 inches or less.

\* \* \* \* \*